United States Patent [19]

Schäfer

[11] Patent Number: 4,674,418

[45] Date of Patent: Jun. 23, 1987

[54] CYCLONE CLEANER FOR A FIXED BED REACTOR

[75] Inventor: Wolfgang Schäfer, Bottrop, Fed. Rep. of Germany

[73] Assignee: Ruhrkohle Aktiengesellschaft, Essen, Fed. Rep. of Germany

[21] Appl. No.: 706,546

[22] Filed: Feb. 28, 1985

[30] Foreign Application Priority Data

Feb. 28, 1984 [DE] Fed. Rep. of Germany ....... 3407157
Aug. 18, 1984 [DE] Fed. Rep. of Germany ....... 3430532

[51] Int. Cl.⁴ .............................................. F23G 5/12
[52] U.S. Cl. .................................. 110/229; 55/346; 110/216
[58] Field of Search ............... 110/216, 229; 55/343, 55/346; 48/77, 101, 128

[56] References Cited

U.S. PATENT DOCUMENTS

| | | |
|---|---|---|
| 1,223,335 | 4/1917 | Woodward . |
| 1,890,070 | 12/1937 | Whiton, Jr. ............................ 55/213 |
| 2,707,148 | 4/1955 | Kollgaard ............................. 48/201 |
| 2,799,355 | 7/1957 | Easton ............................. 55/346 X |
| 3,263,748 | 8/1966 | Jemal et al. ............................. 165/87 |
| 3,310,836 | 3/1967 | Nichols ..................................... 18/12 |
| 3,358,624 | 12/1967 | Way ....................................... 110/22 |
| 3,635,003 | 1/1972 | Schindling et al. .............. 55/346 X |
| 3,727,562 | 4/1973 | Bauer ................................... 110/1 P |
| 3,893,504 | 7/1975 | Gaines, Jr. .............................. 165/1 |
| 3,963,598 | 6/1976 | Manowitz et al. ....................... 208/8 |
| 4,027,699 | 6/1977 | Andersson et al. ............. 137/625.37 |
| 4,033,730 | 3/1977 | Baron et al. ............................. 48/86 |
| 4,051,791 | 10/1977 | Wormser ................................ 110/28 |
| 4,057,400 | 11/1977 | Kaimann et al. ....................... 48/77 |
| 4,111,158 | 9/1978 | Reh et al. ................................ 122/4 |
| 4,123,502 | 10/1978 | Hölter et al. ......................... 423/230 |
| 4,238,200 | 12/1980 | Richter ................................... 44/16 |
| 4,253,409 | 3/1981 | Wormser ............................. 110/347 |
| 4,263,027 | 4/1981 | Varnas et al. .......................... 55/346 |
| 4,343,246 | 8/1982 | Jukkola et al. ....................... 110/222 |
| 4,356,004 | 10/1982 | Richter ................................ 48/210 |
| 4,359,326 | 11/1982 | Hoffert et al. .......................... 48/62 |
| 4,375,365 | 3/1983 | Muller et al. .......................... 55/346 |
| 4,475,467 | 10/1984 | Korenberg .......................... 110/245 |
| 4,476,790 | 10/1984 | Borio et al. .......................... 110/245 |

FOREIGN PATENT DOCUMENTS

| | | |
|---|---|---|
| 141682 | 5/1980 | German Democratic Rep. . |
| 1289143 | 9/1972 | United Kingdom . |
| 1534214 | 11/1978 | United Kingdom . |

OTHER PUBLICATIONS

"Entstaubung Heisser Gase", Chem.-Ing.-Tech., 51, (1979) vol. 10, p. 921.

"Kurzes Lehr- Und Handbuch der Technologie Der Brennstoffe", Ernst G. Graf, 1955, p. 352.

*Primary Examiner*—Edward G. Favors
*Attorney, Agent, or Firm*—Nils H. Ljungman

[57] ABSTRACT

A cyclone arrangement for cleaning gas from a gas generator for gasifying coal which is exhausted at high pressures. The invention proposes that the cyclone arrangement for the cleaning of crude gas includes at least two cyclones connected in parallel on their input sides, which cyclones can be turned on and off individually. Thereby a dry cleaning of the crude gas can be performed with only a slight temperature loss. The quantity of gas corresponding to the optimum cleaning efficiency can be adjusted to the quantity of gas either discharged from the gas generator or actually required for the pressurization of the steam generator by adjusting the number of cyclones put into operation, without the need for the inclusion of buffer capacities. The gas generator comprises a pressurized fixed bed reactor.

12 Claims, 2 Drawing Figures

CYCLONE CLEANER FOR A FIXED BED REACTOR

CROSS REFERENCE TO CO-PENDING APPLICATIONS

Co-pending application Ser. No. 706,545, filed on Feb. 28, 1985, entitled "Gas Generator Installaton"; co-pending application Ser. No. 706,542, filed on Feb. 28, 1985, entitled "A Combined Steam Turbine And Gas Turbine Electric Power Plant"; and co-pending application Ser. No. 706,543, filed on Feb. 28, 1985, entitled "A Fluidized Bed Coal Gasification Installation In An Electric Power Plant", are all assigned to the same assignee as the instant application and are incorporated herein by reference.

BACKGROUND OF THE INVENTION

1. Field of the Invention

The invention relates generally to gas generator installation, and more particularly, to a gas generator installation with a pressurized fixed bed reactor, in which coal is gasified, and with an apparatus to clean the crude gas which is under high pressure.

For reasons of simplification, the two above-mentioned types of gas generators are lumped together and called pressurized reactors below.

2. Description of the Prior Art

Inside the pressurized reactor, coal fines are gasified under high pressure. The gas produced in this manner can be used, for example, for the production of energy.

It is generally necessary to clean the gas coming out of the pressurized reactor, that is, specifically to free it from dust and tar. In addition, it is generally also necessary to adjust the output of the gas generator in question to the current gas requirement. The latter can change relatively more frequently and in a brief period of time so that it is appropriate if the gas generator is correspondingly adjustable.

If it is desirable to eliminate the inclusion of sufficiently large buffer capacities, as known in the prior art, between the gas generator and a downstream portion of the power plant, then the capacity of the gas generator and the corresponding capacity of the apparatus for the cleaning of the crude gas must be adjusted thereto.

To clean a crude gas, a so-called wet washing is generally used. A wet washing process is disclosed in U.S. Pat. No. 4,123,502. However, this wet washing has the disadvantage that the crude gas, when discharged from the gas generator installation, has been, relatively speaking, cooled off a great deal by the washing. This cooling represents an energy loss which has a deleterious influence on the overall efficiency of a plant containing the gas generator installation.

The following patents describe and show some examples of fixed bed reactors for gasification of coal, which documents are incorporated herein by reference: U.S. Pat. No. 4,238,200 entitled "Process For The Production Of Fuel From Fine Coal For Coal Pressure Gasification In A Fixed Bed Reactor," and U.S. Pat. No. 4,356,004 entitled "Process For Forming Charging Fuel Into Agglomerates For The Pressure Gasification of Coal", and further U.S. Pat. Nos. 1,223,335; 2,707,148; 3,263,748; 3,310,836; 3,893,504; 4,033,730; 4,057,400 and Federal Republic of Germany Pat. No. 2629182.

The following patents describe and show some examples of fluidized bed reactors for gasification of coal, which documents are incorporated herein by reference: U.S. Pat. Nos. 3,963,598; 4,111,158; 4,343,246; 4,359,326; 4,475,467; and 4,476,790.

The gas discharged from the pressurized reactor must be cleaned, for example, specifically freed of dust and tar. The apparatus used for this purpose is generally a wet washer. The use of wet washing causes a reduction in the temperature of the gas and, therefore, a disadvantageous energy loss. As a result, the overall efficiency of the energy generation installation is reduced.

The following are examples of patents having cyclones, which documents are incorporated herein by reference: U.S. Pat. Nos. 3,358,624; 3,727,562; 4,051,791; 4,253,409 and United Kingdom Pat. No. 1289143.

OBJECT OF THE INVENTION

The object according to the invention is the creation of a gas generator installation of the type described above so that, on one hand, it meets the requirements for the adjustability of output and, on the other hand, it largely eliminates the current undesirable energy loss.

SUMMARY OF THE INVENTION

This object is achieved by the invention in that the apparatus used to clean the crude gas has at least two cyclones connected in parallel on the input side, and that the cyclones can be turned on or off individually.

A cyclone, of course, is known in another context as an apparatus used to clean a gas. In the framework of a gas generation installation, however, the use of an individual cyclone would be out of the question on account of the absence of the necessary capability of adjustment of capacity. However, if several cyclones are connected in parallel, and if the cyclones can be turned on and off by means of an appropriate control as a function of the current output requirement, the desired adjustment capability is achieved, while at the same time the use of a wet washing which leads to an energy loss can be avoided.

According to the invention, it is also proposed that the feed of the crude gas to the cyclones be achieved by means of a pipeline. This pipeline has gas discharge tubes which are disposed one behind the other along the longitudinal axis of the pipeline.

The discharge tubes leading to each cyclone extend laterally from the pipeline with each emptying into an associated cyclone pipeline having a closing piston disposed therein which can be moved in the direction of the longitudinal axis and which substantially shuts off the entire cross section of the pipeline.

Depending on the number of cyclones used, a corresponding number of gas discharge tubes are connected to the pipeline. Depending on the position of the closing piston, the desired number of gas discharge tubes can be opened by a corresponding activation and positioning of the closing piston. It is especially advantageous that this control capability can be achieved without the use of valves which would be very difficult and expensive on account of the pressure and temperature conditions. On the other hand, the added technical complexity and investment required for this line system and the closing piston is very low.

To be able to guide the gas current in the region of the end surface of the closing piston, for example at the bend in the individual gas discharge tube, in a manner which is as free of turbulence as possible, the invention also proposes that the end surface of the closing piston facing the gas current be curved toward the cross section of a gas discharge tube. This means that an almost continuous deflection of the gas current between the longitudinal axis of the pipeline and the axis of the gas discharge tube is possible.

BRIEF DESCRIPTION OF THE DRAWINGS

One embodiment of the invention is described in greater detail below with reference to the drawings.

DESCRIPTION OF THE PREFERRED EMBODIMENTS

Figure 1:
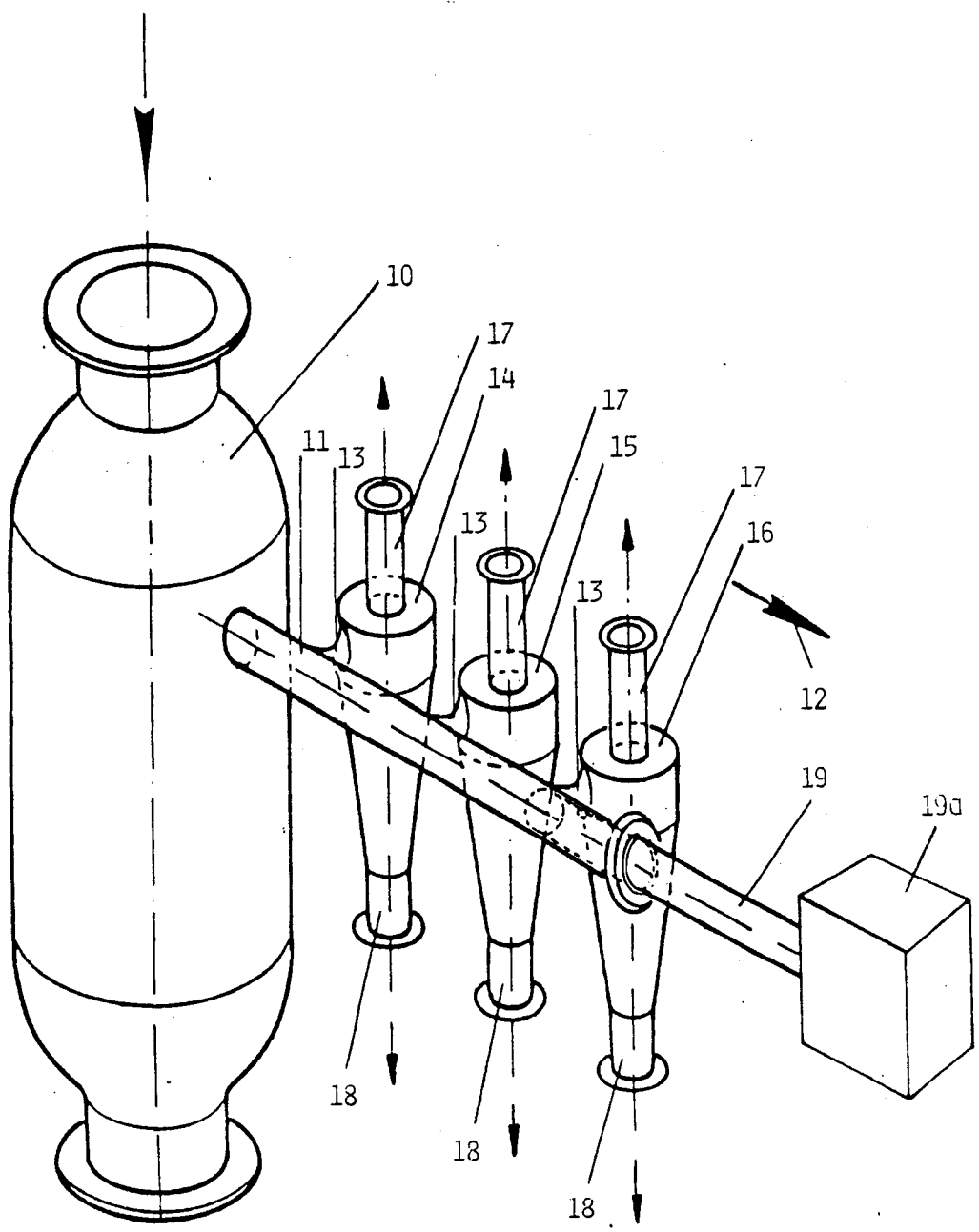
FIG. 1 shows schematically in perspective a compressed gas generation installation with cyclones connected downstream.

In FIG. 1, the pressurized gas generator 10 is fed into a pipeline 11. The direction of flow is indicated by an arrow 12. Gas discharge tubes 13, which run approximately radial to the pipeline, connect into the pipeline 11 like a manifold. Each of the tubes 13 leads to the input of a cyclone 14, 15 or 16. Each of the three cyclones 14, 15 and 16 has, in its upper region, a discharge 17 for cleaned gas, while there is a dust discharge 18 on the bottom of each of the cyclones 14, 15 and 16.

Figure 2:
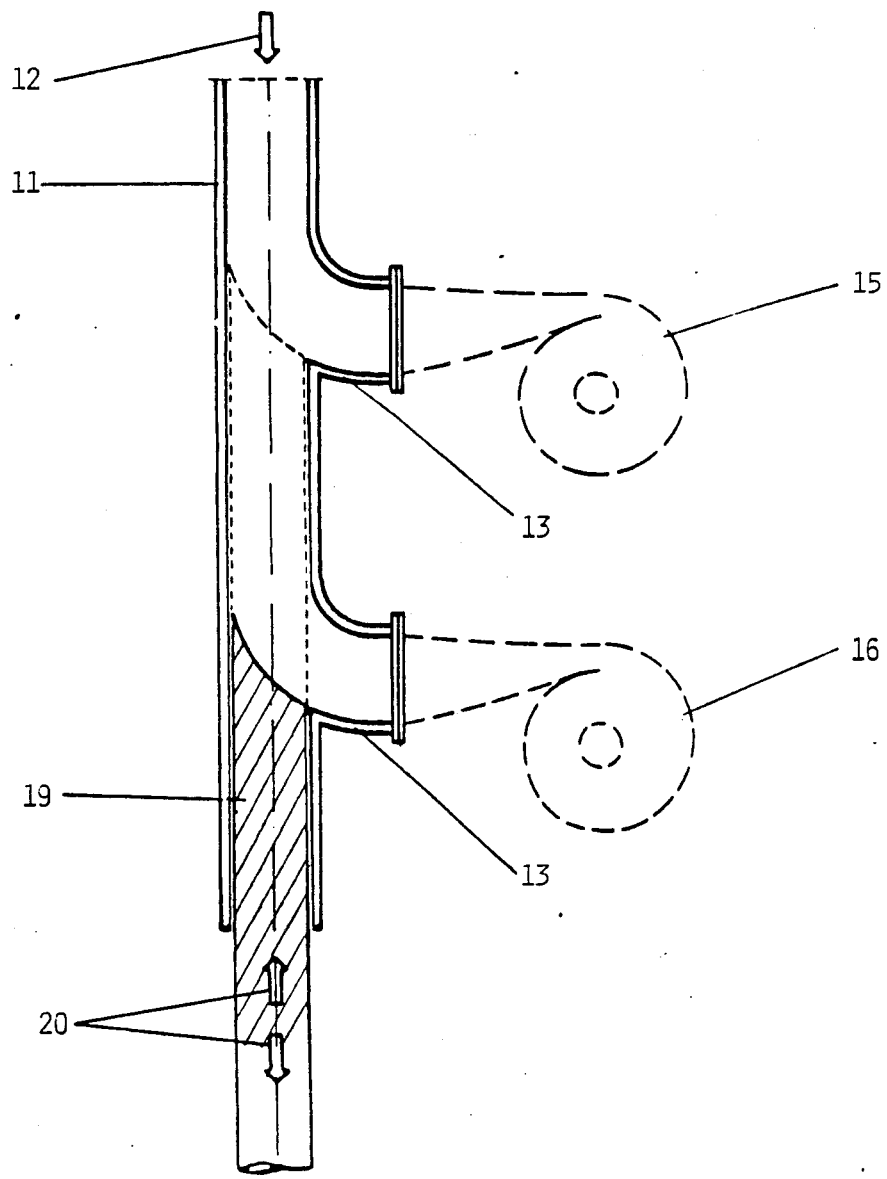
FIG. 2 shows an overhead view of a portion of the installation shown in FIG. 1, with a section of the pipeline with the closing piston therein.

In FIG. 2, in the pipeline 11, there is a closing piston 19 which moves in the longitudinal direction of the line, and which has the form of a rod extending through the pipeline 11. The inflow side of the closing piston 19 is curved in such a way that the radius of the curved inflow surface makes the transition as continuous as possible to the corresponding course of the gas discharge tube 13 in question. This guarantees an essentially uniform diversion of the gas current into the gas discharge tubes 13 in question.

Referring again to FIG. 1, the closing piston 19 is connected to a drive 19a, by means of which it is possible to move the closing piston 19 in the directions indicated by the two arrows 20. The drive can be designed as a piston-cylinder arrangement or as a motor with an associated rack and pinion gear or similar set-up.

The cyclones 14, 15 and 16 are connected in parallel to one another. By moving the closing piston 19 into the appropriate position, it is possible to pressurize either only the cyclone identified with reference number 14 with gas. In the case where the closing piston 19 is in the appropriate position with respect to the gas discharge tubes 13 corresponding to the cyclone 14, cyclones 15 and 16 are closed off. The closing piston 19, to make the adjustment for an increased amount of gas to be cleaned at the moment, it placed in the corresponding position at the gas discharge tubes 13 of the cyclone 15 or of the cyclone 16, so that two or three cyclones are then in operation. This makes possible a proper adjustment of the amount of gas coming from the pressurized gas generator 10 to the amount of gas at which a cyclone of the type used has its optimum cleaning efficiency. The individual cyclones can be turned on and off by means of the proposed apparatus with only a small expense involved for equipment and energy, and also has a very fast response time.

Referring now to FIG. 2, a detailed view of the closing piston 19, and the gas discharge tubes 13 connected to each of its cyclones 15 and 16, is shown. The curve at an inward end of the closing piston 19 is adapted to charge the direction of flow, indicated by the arrow 12, in a gradual manner thereby minimizing disturbances in and by the flow.

The closing piston 19 is made from heat resistant material and/or has been surface treated to minimize erosion by the dust in the gases.

The cyclone arrangement as described above may have other applications as an independent unit.

The cyclone arrangement as described above may have other applications in a fluidized bed reactor.

The invention is not to be taken as limited to all the details that are described hereinabove, since modifications and variations thereof may be made without departing from the spirit or scope of the invention.

What is claimed is:

1. A cyclone arrangement for cleaning pressurized gas from a gas generator in which coal is gasified, said cyclone arrangement comprising:

a plurality of cyclones which are connected by an unobstructed passage to receive gas to be cleaned from a common gas input means connected to said gas generator;

sliding means disposed to turn said cyclones on and off incrementally by at least one cyclone at a time, whereby any desired number of cyclones from said plurality of cyclones can be included, in operation, in response to varying quantities of gas generated, and whereby cleaning efficiency of said cyclone arrangement is maximized during varying cleaning loads;

said common gas input means comprising:

a conduit from which each said plurality of cyclones is connected;

said cyclones each having an inlet connected to said conduit;

said sliding means for turning said cyclones on and off comprising a piston disposed in said conduit to move therealong adjacent said inlets of said cyclones to sequentially cover and uncover said inlets of said cyclones; and means for moving said piston in said conduit to cover and uncover said inlets of said cyclones.

2. The cyclone arrangement for cleaning gas from a gas generator according to claim 1 wherein said inlets of said cyclones comprise tubes which connect into said conduit at a side of said conduit and are disposed one behind the other.

3. The cyclone arrangement for cleaning gas from a gas generator according to claim 1 wherein said piston has a curved surface at one end thereof to change the direction of gas flowing in said conduit to admit said flowing gas into said inlet tubes of said cyclone, said one end of said piston having said curved surface being disposed within said conduit.

4. The cyclone arrangement for cleaning gas from a gas generator according to claim 2 wherein said piston has a curved surface at one end thereof to change the direction of gas flowing in said conduit to admit said flowing gas into said inlet tubes of said cyclone, said one end of said piston having said curved surface being disposed within said conduit.

5. The cyclone arrangement for cleaning gas from a gas generator according to claim 1 wherein said gas generator is a fixed bed reactor.

6. The cyclone arrangement for cleaning gas from a gas generator according to claim 5 wherein said fixed bed reactor is a high pressure reactor.

7. The cyclone arrangement for cleaning gas from a gas generator according to claim 2 wherein said gas generator is a fixed bed reactor.

8. The cyclone arrangement for cleaning gas from a gas generator according to claim 7 wherein said fixed bed reactor is a high pressure reactor.

9. The cyclone arrangement for cleaning gas from a gas generator according to claim 3 wherein said gas generator is a fixed bed reactor.

10. The cyclone arrangement for cleaning gas from a gas generator according to claim 4 wherein said gas generator is a fixed bed reactor.

11. The cyclone arrangement for cleaning gas from a gas generator according to claim 9 wherein said fixed bed reactor is a high pressure reactor.

12. The cyclone arrangement for cleaning gas from a gas generator according to claim 10 wherein said fixed bed reactor is a high pressure reactor.

* * * * *